United States Patent
Johnson et al.

(10) Patent No.: US 10,747,767 B2
(45) Date of Patent: *Aug. 18, 2020

(54) METHODS FOR ENHANCING RAPID DATA ANALYSIS

(71) Applicant: Interana, Inc., Redwood City, CA (US)

(72) Inventors: Robert Johnson, Palo Alto, CA (US); Oleksandr Barykin, Sunnyvale, CA (US); Alex Suhan, Menlo Park, CA (US); Lior Abraham, San Francisco, CA (US); Don Fossgreen, Scotts Valley, CA (US)

(73) Assignee: Interana, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,603

(22) Filed: Apr. 15, 2019

(65) Prior Publication Data

US 2019/0243835 A1    Aug. 8, 2019

Related U.S. Application Data

(63) Continuation of application No. 15/043,333, filed on Feb. 12, 2016, now Pat. No. 10,296,507.

(60) Provisional application No. 62/115,404, filed on Feb. 12, 2015.

(51) Int. Cl.
  *G06F 21/00*     (2013.01)
  *G06F 16/2455*   (2019.01)
  *G06F 16/27*     (2019.01)

(52) U.S. Cl.
  CPC ...... *G06F 16/24554* (2019.01); *G06F 16/278* (2019.01)

(58) Field of Classification Search
  CPC .................. G06F 16/24554; G06F 16/278
  See application file for complete search history.

(56) References Cited

U.S. PATENT DOCUMENTS

| | | | |
|---|---|---|---|
| 5,335,345 | A  | 8/1994  | Frieder et al. |
| 5,668,987 | A  | 9/1997  | Schneider |
| 5,893,090 | A  | 4/1999  | Friedman et al. |
| 5,978,791 | A  | 11/1999 | Farber et al. |
| 6,606,618 | B2 | 8/2003  | Delo |
| 6,775,681 | B1 | 8/2004  | Ballamkonda et al. |
| 7,010,521 | B2 | 3/2006  | Hinshaw et al. |
| 7,213,012 | B2 | 5/2007  | Jakobsson et al. |
| 7,587,394 | B2 | 9/2009  | Chang et al. |
| 7,617,235 | B2 | 11/2009 | Srinivasan et al. |
| 8,239,383 | B2 | 8/2012  | Santosuosso |

(Continued)

FOREIGN PATENT DOCUMENTS

| | | |
|---|---|---|
| JP | 10232804 | 9/1998  |
| JP | 10-26248 | 10/1998 |

(Continued)

*Primary Examiner* — David Garcia Cervetti
(74) *Attorney, Agent, or Firm* — Jeffrey Schox; Diana Lin

(57) ABSTRACT

A method for enhancing rapid data analysis includes receiving a set of data; storing the set of data in a first set of data shards sharded by a first field; and identifying anomalous data from the set of data by monitoring a range of shard indices associated with a first shard of the first set of data shards, detecting that the range of shard indices is smaller than an expected range by a threshold value, and identifying data of the first shard as anomalous data.

15 Claims, 7 Drawing Sheets

Identify Anomalous Data

Handle Anomalous Data

(56) References Cited

U.S. PATENT DOCUMENTS

| | | | |
|---|---|---|---|
| 8,356,050 B1* | 1/2013 | Olston | G06F 16/986 707/769 |
| 8,468,132 B1* | 6/2013 | O'Neill | G06F 16/184 707/622 |
| 8,751,460 B1* | 6/2014 | Annapragada | G06F 16/90335 707/684 |
| 8,756,209 B2 | 6/2014 | Do et al. | |
| 8,768,870 B1 | 7/2014 | Corrado et al. | |
| 8,825,752 B1* | 9/2014 | Madhavan | G06F 11/3485 709/200 |
| 8,856,169 B2 | 10/2014 | Zhang et al. | |
| 8,868,580 B2 | 10/2014 | Gould et al. | |
| 8,903,973 B1* | 12/2014 | Hindawi | H04L 45/44 709/223 |
| 8,935,318 B1* | 1/2015 | Konerding | G06F 9/5072 709/203 |
| 8,965,915 B2 | 2/2015 | Ganti et al. | |
| 9,053,167 B1 | 6/2015 | Swift et al. | |
| 9,128,877 B1* | 9/2015 | Cousins | H03M 13/15 |
| 9,171,104 B2 | 10/2015 | Gotz et al. | |
| 9,195,826 B1* | 11/2015 | Fang | G06F 21/56 |
| 9,246,932 B2 | 1/2016 | Gorny et al. | |
| 9,251,097 B1* | 2/2016 | Kumar | G06F 12/1408 |
| 9,424,351 B2 | 8/2016 | Risvik et al. | |
| 9,774,401 B1* | 9/2017 | Borrill | H04L 9/0852 |
| 9,900,337 B2 | 2/2018 | Gorny et al. | |
| 10,009,732 B1* | 6/2018 | Rice | H04L 67/10 |
| 10,148,548 B1* | 12/2018 | Griffin | H04L 41/064 |
| 10,198,492 B1* | 2/2019 | O'Neill | G06F 16/273 |
| 10,268,835 B2* | 4/2019 | Beckman | G06F 21/6227 |
| 10,331,695 B1* | 6/2019 | Stickle | G06F 16/27 |
| 2001/0032199 A1 | 10/2001 | Delo | |
| 2002/0178151 A1 | 11/2002 | Chaudhuri et al. | |
| 2003/0195872 A1 | 10/2003 | Senn | |
| 2003/0212668 A1 | 11/2003 | Hinshaw et al. | |
| 2004/0143756 A1 | 7/2004 | Munson et al. | |
| 2004/0225639 A1 | 11/2004 | Jakobsson et al. | |
| 2004/0230764 A1 | 11/2004 | Merchant et al. | |
| 2004/0243568 A1 | 12/2004 | Wang et al. | |
| 2005/0055254 A1 | 3/2005 | Schmidtberg et al. | |
| 2005/0065914 A1 | 3/2005 | Chang et al. | |
| 2005/0114369 A1 | 5/2005 | Gould et al. | |
| 2005/0182762 A1 | 8/2005 | Srinivasan et al. | |
| 2005/0223019 A1 | 10/2005 | Das et al. | |
| 2006/0059439 A1 | 3/2006 | Hao et al. | |
| 2006/0069955 A1 | 3/2006 | Oka et al. | |
| 2006/0224793 A1 | 10/2006 | Purlia | |
| 2007/0118909 A1 | 5/2007 | Hertzog et al. | |
| 2007/0150949 A1 | 6/2007 | Futamura et al. | |
| 2007/0239716 A1* | 10/2007 | Weininger | G06F 16/335 |
| 2007/0294214 A1 | 12/2007 | Santosuosso | |
| 2008/0022261 A1 | 1/2008 | Gooding | |
| 2008/0109423 A1 | 5/2008 | Barsness et al. | |
| 2008/0215576 A1 | 9/2008 | Zhao et al. | |
| 2008/0250497 A1 | 10/2008 | Mullarkey et al. | |
| 2009/0070752 A1* | 3/2009 | Alpern | G06F 8/443 717/148 |
| 2009/0271762 A1* | 10/2009 | Taylor | G06Q 10/10 717/107 |
| 2010/0138919 A1 | 6/2010 | Peng et al. | |
| 2011/0196855 A1* | 8/2011 | Wable | G06F 16/24554 707/711 |
| 2012/0016633 A1* | 1/2012 | Wittenstein | G06F 21/552 702/180 |
| 2012/0036580 A1 | 2/2012 | Gorny et al. | |
| 2012/0130997 A1 | 5/2012 | Risvik et al. | |
| 2013/0091170 A1 | 4/2013 | Zhang et al. | |
| 2013/0124574 A1* | 5/2013 | Brettin | G06F 16/9024 707/798 |
| 2013/0159251 A1* | 6/2013 | Skrenta | G06F 16/2282 707/612 |
| 2013/0173597 A1 | 7/2013 | Do et al. | |
| 2013/0304694 A1* | 11/2013 | Barreto | G06F 11/2023 707/608 |
| 2013/0346417 A1 | 12/2013 | Sakurai et al. | |
| 2014/0012814 A1 | 1/2014 | Bercovici et al. | |
| 2014/0108380 A1 | 4/2014 | Gotz et al. | |
| 2014/0108421 A1 | 4/2014 | Isaacson et al. | |
| 2014/0123115 A1* | 5/2014 | Peretz | G06F 11/362 717/127 |
| 2014/0157370 A1* | 6/2014 | Plattner | H04L 63/1441 726/4 |
| 2014/0280287 A1 | 9/2014 | Ganti et al. | |
| 2014/0337491 A1* | 11/2014 | Barreto | G06F 16/182 709/221 |
| 2015/0067860 A1 | 3/2015 | Levow et al. | |
| 2015/0095351 A1* | 4/2015 | Balikov | G06F 16/24549 707/752 |
| 2015/0186493 A1 | 7/2015 | Balmin et al. | |
| 2015/0213358 A1* | 7/2015 | Shelton | H04L 41/0604 706/47 |
| 2015/0271284 A1* | 9/2015 | Hindawi | H04L 67/32 709/213 |
| 2015/0347492 A1 | 12/2015 | Dickie | |
| 2016/0021122 A1 | 1/2016 | Pevny | |
| 2016/0036844 A1 | 2/2016 | Kopp et al. | |
| 2016/0080410 A1 | 3/2016 | Gorny et al. | |
| 2016/0085839 A1* | 3/2016 | D'Halluin | G06F 16/2255 707/747 |
| 2016/0154851 A1* | 6/2016 | Sugaya | G06F 16/2228 707/741 |
| 2016/0154963 A1* | 6/2016 | Kumar | H04L 9/0822 713/189 |
| 2016/0171071 A1 | 6/2016 | Beisiegel et al. | |
| 2017/0024452 A1 | 1/2017 | Budalakoti et al. | |
| 2017/0300490 A1 | 10/2017 | Kachemir et al. | |

FOREIGN PATENT DOCUMENTS

| | | |
|---|---|---|
| JP | 2005100392 A | 4/2005 |
| JP | 2012108635 A | 6/2012 |
| JP | 2013196565 A | 9/2013 |
| WO | 2010018178 A1 | 2/2010 |
| WO | 2010148415 A1 | 12/2010 |
| WO | 2013016620 A2 | 1/2013 |
| WO | 2013033123 A2 | 3/2013 |

* cited by examiner

| e.time | e.user_id | e.user_ip |
|--------|-----------|-----------|
| 12:20  | 204595    | 192.123.123.12 |
| 12:24  | 204595    | 192.103.12.0 |
| 09:32  | 546345    | 192.103.12.0 |
| 10:11  | 546345    | 128.12.211.31 |
| 01:45  | 123411    | 192.103.12.0 |
| 05:21  | 123411    | 192.123.13.12 |

| e.time | e.user_id | e.user_ip |
|--------|-----------|-----------|
| 10:11  | 546345    | 128.12.211.31 |
| 01:45  | 123411    | 192.103.12.0 |
| 09:32  | 546345    | 192.103.12.0 |
| 12:24  | 204595    | 192.103.12.0 |
| 05:21  | 123411    | 192.123.13.12 |
| 12:20  | 204595    | 192.123.123.12 |

FIGURE 2

| e.count | | e.count |
|---|---|---|
| 1 | | 1;1 |
| 0 | | 5;0 |
| 0 | | 4;1 |
| 0 | | 5;0 |
| 0 | | |
| 0 | run-length encoding → | |
| 1 | | |
| 1 | | |
| 1 | | |
| 1 | | |
| 0 | | |
| 0 | | |
| 0 | | |
| 0 | | |
| 0 | | |

FIGURE 3

| e.count | | e.count |
|---|---|---|
| 96567 | | 96567 |
| 96567 | | 0 |
| 96568 | | 1 |
| 96568 | | 0 |
| 96568 | | 0 |
| 96568 | delta encoding → | 0 |
| 96568 | | 0 |
| 96570 | | 2 |
| 96570 | | 0 |
| 96570 | | 0 |
| 96571 | | 1 |
| 96571 | | 0 |
| 96572 | | 1 |
| 96572 | | 0 |
| 96572 | | 0 |

FIGURE 4

METHODS FOR ENHANCING RAPID DATA ANALYSIS

CROSS-REFERENCE TO RELATED APPLICATIONS

This application is a continuation of U.S. application Ser. No. 15/043,333, filed 12 Feb. 2016, which claims the benefit of U.S. Provisional Application Ser. No. 62/115,404, filed on 12 Feb. 2015, all of which are incorporated in their entireties by this reference.

TECHNICAL FIELD

This invention relates generally to the data analytics field, and more specifically to new and useful methods for enhancing rapid data analysis in the data analytics field.

BACKGROUND

Businesses today collect huge amounts of data relating to sales, marketing, and other critical operations. Querying this data is often a difficult and resource intensive process, especially for many types of complex queries. To some extent, query performance can be improved by generating data aggregates and indices, but it is infeasible to do this across all dimensions in a large dataset. Because of this, query performance issues often slow data analysis. Thus, there is a need in the data analytics field to create methods for enhancing for rapid data analysis. This invention provides such new and useful methods.

BRIEF DESCRIPTION OF THE FIGURES

FIG. 2 is an exemplary table view of an event data stream;

FIG. 3 is an exemplary view of run length encoding;

FIG. 4 is an exemplary view of delta encoding;

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
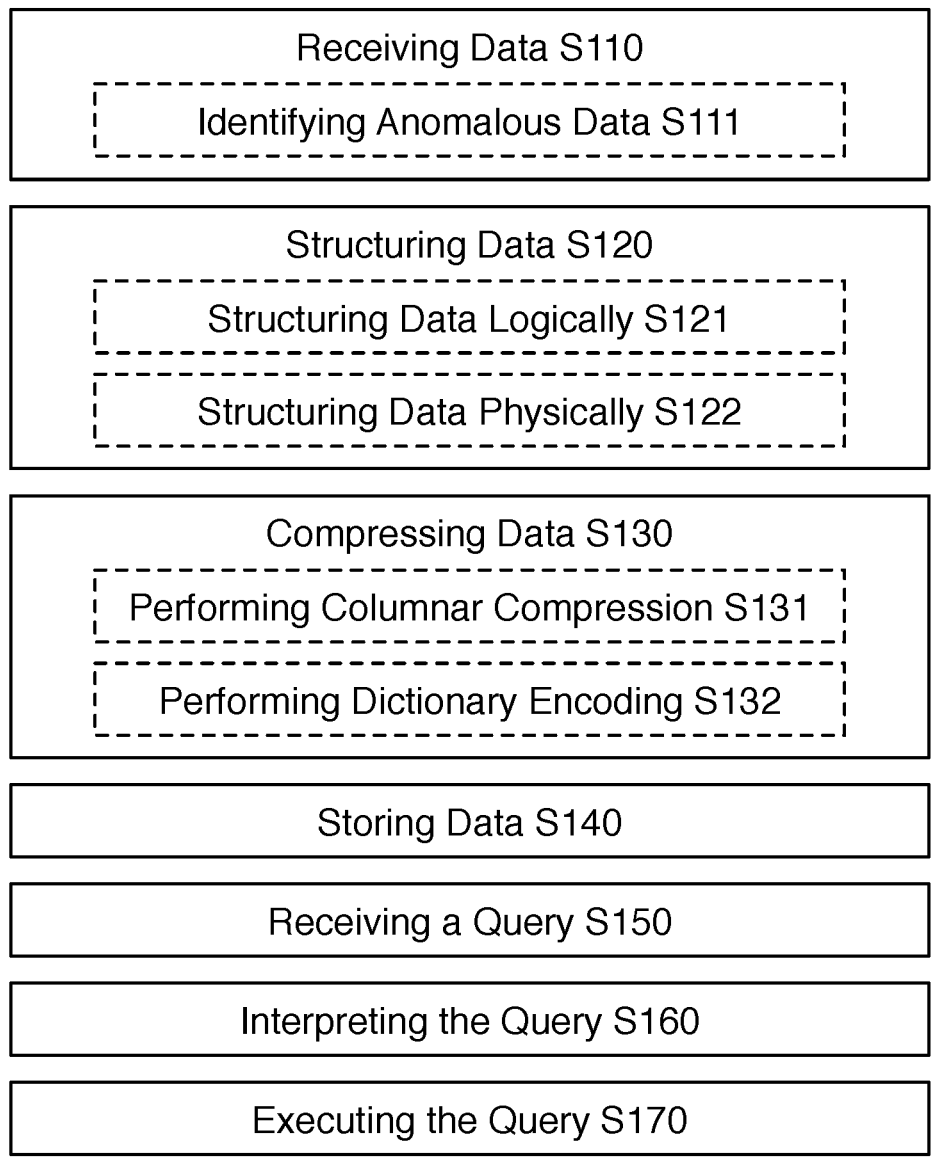
FIG. 1 is a chart view of a method of a preferred embodiment.

As shown in FIG. 1, a method 100 for enhancing rapid data analysis includes one or more of receiving data S110, structuring data S120, compressing data S130, storing data S140, receiving a query S150, interpreting the query S160 and executing the query S170.

The method 100 functions to enhance rapid data analysis by structuring and compressing data such that data can be sampled efficiently and effectively in a distributed computing environment, in turn allowing queries to sample many datasets simultaneously and return results from these datasets without having to search their entirety. The method 100 may be used to effectively handle large amounts of data received in short amounts of time; data structuring (e.g., sharding, storage, compression) and multi-pass querying allow relevant data to be identified quickly and then targeted for further analysis, preventing time from being wasted on irrelevant data. The scope of each step is preferably adjustable, allowing data storage and queries to be optimized, enhanced or otherwise improved for the ideal ratio of speed to accuracy.

The method 100 preferably runs on a platform intended for rapid data analysis, such as the system for rapid data analysis of U.S. patent application Ser. No. 14/644,081, the entirety of which is incorporated by this reference.

Step S110 includes receiving data. Step S110 functions to import data for which analysis is desired to one or more databases or data stores. Data imported by Step S110 may be from one data source (e.g., a single server streaming event data) or multiple data sources (e.g., several databases containing desired information). Data imported in Step S110 preferably may be preferably be of any data schema; additionally or alternatively, data imported in Step S110 may have multiple schemas (i.e., some data imported is of a first schema, other data imported is of a second schema, etc.) or may be schema-less. Data sources may be databases, data stores, streaming data sources, or any suitable source for data. Data is preferably received over a network connection (e.g., over a LAN or over the internet), but may additionally or alternatively be received in any suitable manner (e.g., loaded from a hard drive).

Step S110 preferably includes importing data from one or more data sources through an application programming interface (API), but may additionally or alternatively include importing data in any other suitable manner.

For a single implementation of the method 100, Step S110 may be operable in multiple different instances; for example, a distributed computer system might include several nodes, each operating instances of Step S110 (on the same data source, or on different data sources).

Data imported by Step S110 is preferably event data, but may additionally or alternatively be any suitable type of data. Event data entries imported by Step S110 preferably include timestamps or other time indicators, which may be used for preliminary ordering/storage. Event data preferably has at least an associated time field and a session field.

In a variation of a preferred embodiment, Step S110 includes identifying anomalous data S111. For example, imported event data may include user session event data for a website, including session times and IP addresses of website users. An example of potentially anomalous data in this scenario might include a very large number of sessions from a single IP address or user ID (e.g., 10 percent of all sessions).

Anomalous data is preferably identified at import time (e.g., during Step S110) but may additionally or alternatively be identified at any other time (e.g., post-import during structuring, during execution of a query, or at any later time). Anomalous data is preferably identified according to a manually configured ruleset (e.g., a rule that any user ID with over 1,000 sessions in a day is an anomalous user, or a rule that any IP address corresponding to 10% or more of a set of session data is anomalous, etc.) but may additionally or alternatively be identified in any other way (e.g., according to heuristics or other algorithms).

Anomalous data may be identified based on absolute metrics (e.g., the previously mentioned 1,000 session example) or relative ones; for example, data may be identified as anomalous by noting that some characteristic of the data is substantially different from other data. This could be done, for example, by identifying that a particular value (associated with some data field) of a range of values has drastically more data entries/elements than other values in the range. More generally, anomalous data can be identified using any statistical outlier finding techniques.

After identifying anomalous data (or potentially anomalous data), Step S110 may include flagging the anomalous data or otherwise providing indications of anomalous data. For example, Step S110 may include flagging anomalous data such that the data may be structured (Step S120), compressed (Step S130) or stored (Step S140) in a different manner than non-anomalous data.

Step S120 includes structuring data. Step S120 functions to prepare data (imported by Step S110) to be stored in Step S140 by providing information about where and how the data should be stored.

Step S120 is preferably performed after data has been imported in Step S110 and preliminarily stored in Step S140, but may additionally or alternatively occur at any time. For example, data may be structured as it is imported, before preliminary storage. Data may also be structured at any time after storage; for example, data may be preliminarily stored, structured, and then at some later time may be re-structured.

Step S120 may include receiving a trigger to restructure data (and restructuring data after receiving the trigger). For instance, Step S120 may include detecting that query performance has dropped below a threshold value, and restructuring data to improve query performance (e.g., query speed). As another example, Step S120 may include restructuring data after size or time thresholds; e.g., after a dataset grows beyond a threshold number of entries or columns, or after a dataset has not been restructured for a week.

Structuring data S120 may include structuring data logically S121 and/or structuring data physically S122.

Structuring data logically S121 functions to determine how data should be represented in a database and/or data store. Structuring data logically S121 may include organizing data according to a particular format, schema, or other system of organization. For example, Step S121 may include taking incoming data and formatting the data into tables based on the content of the data.

Step S121 preferably includes organizing data into one or more columnar databases or datasets, but may additionally or alternatively include organizing data in any manner (e.g., organizing data into row-oriented databases or correlation databases).

Step S121 may include duplicating data and representing copies in different ways; for example, events may be represented in one table organized by user ID (UID) and also in a second table organized by timestamp. In particular, Step S121 may include denormalizing data; denormalizing data may increase the amount of memory occupied by a particular dataset, but may also increase read performance. Denormalization may be particularly applicable in cases where the cost of memory is inexpensive compared to the costs associated with read delays.

Denormalization may be particularly advantageous for columnar databases; because adding a column to a columnar database does not affect performance unless the column is accessed, scanning denormalized columns may provide significant speed advantages over using a lookup table, for example.

Step S121 may include generating a set of constraints during the denormalization process; these constraints specify how redundant data is synchronized. Additionally or alternatively, generating constraints may not be necessary (e.g., in cases where data is not modified after import).

In one example, Step S121 includes logically structuring event data that has an associated time field and a session field as shown in FIG. 2. One dataset may include a list of events grouped by user-id (UID) and organized by time; while another dataset may include the same list of events, but grouped by IP address and organized by time. Different datasets may store identical data, as in the above example, but different datasets may also store different subsets of the same data, or different data entirely. For example, one dataset may include a list of events grouped by UID and organized by time, where the events also include IP address and location fields. A second dataset may include a list of the same events, grouped by IP address and organized by time, but the event information does not include a location or UID.

Step S121 may include structuring data implicitly in addition to explicitly. Implicit data preferably includes implicitly attached object data sources. For example, in an event stream of sweater sales data, each event could carry explicit data fields that identify the merchant ("e.merchant_id"), terminal ("e.terminal_id"), dollar amount of the transaction ("e.dollar_amount"), and the sweater type sold ("e.sweater_id"). Each event may also have object data sources or other types of implicit data that associate with these explicit data fields; for example, there may be an object data that associates with each "e.sweater_id" properties relating to the sweater type, like size ("sweater_size") and color ("sweater_color"). Step S121 may include structuring this data to make these associated data properties automatically available for queries; for example, the sweater color might be accessed by the field "e.sweater_id.sweater_color".

Structuring data to include direct access to the attribute fields may function to remove the need for table joins. Access to the attribute fields may be facilitated by importing tables declared as join tables. Declaring join tables preferably allows the join tables to be linked with the dimension of a related event data table. Join tables are preferably stored as attribute name-value pairs.

Step S121 may additionally include generating data aggregates. Data aggregates are preferably formed by performing sums, averages, or other mathematical operations on data. Data aggregates preferably anticipate operations performed by common queries in order to save time or processing power when these queries are called. Data aggregates may be created based on manual input from a query engine user, based on a set of rules or other algorithm in response to stored data and/or based on a set of rules or other algorithm in response to queries.

Step S121 preferably includes sharding data. Splitting datasets into shards allow the shards to be distributed across computers in a distributed computing system. Nodes of the distributed computing system preferably store parts of the data contained by a dataset (e.g., one or more shards).

Shards are preferably both horizontal and vertical table partitions; data shards are preferably formed from the intersection of a subset of all rows and a subset of all columns of a data table. Each shard preferably contains at least time information, but may additionally or alternatively contain other information. Shards can be partitioned by time; for example, each data shard may contain a set of events that occurred over a particular 24 hour period. Shards may additionally or alternatively be partitioned by any other suitable information (e.g. UID, IP address, session ID, etc.). Shard partitioning is preferably done by the following rules: vertical partitions preferably include a fixed number of fields, and there are a fixed number of horizontal partitions for each vertical partition. For example, if a dataset includes a time field, a UID field, an IP address field, and a location field, the dataset may be vertically partitioned into three. The first vertical partition would include the time field and the UID field; the second would include the time field and the IP address field, and the third would include the time field and the location field. Then the dataset would be horizontally partitioned by day; if there is one week of data, this would be seven horizontal partitions. Thus, the data would be partitioned into twenty-one shards. Shard partitioning may additionally or alternatively be done automatically by any other rule set or algorithm or may be done manually.

In a variation of a preferred embodiment, shard partitioning is done according to a sampling function. Choosing shard partitions according to a sampling function allows data to be structured in such a way that queries can sample the data efficiently and quickly.

Each shard preferably has a shard number (i.e., a shard index), and each shard number is preferably stored, along with the node on which the shard exists, in a configuration database. This linked data may be additionally or alternatively stored in any suitable location. Keeping a central list of shard and node links preferably enables the determination of the right nodes to query for particular data. The list of shard/node links may additionally include other information, such as a summary of data included in the shard.

Step S121 may also include generating indices, aggregates, and/or other data or objects intended to aid data analysis. In particular, Step S121 may include generating explicit representations of implicit data (e.g., pre-calculating "e.sweater_id.sweater_color" in the previously mentioned example).

Step S121 preferably includes structuring data logically according to a static configuration (e.g., data is structured a particular way, which may be altered manually by a user or administrator), but may additionally or alternatively include structuring data logically according to a dynamic configuration. For example, data may be structured or re-structured based on analysis of queries run on that data or similar data (e.g., if lookups by IP address are common, datasets may be modified to improve performance for lookups by IP address). Dynamic configurations may be modified based on a number of criteria; e.g., past query results, query times, or data access counts/frequency.

Step S122 includes structuring data physically. Step S122 functions to structure data on disk or in memory to increase performance (e.g., by reducing query times). Data is preferably stored in persistent memory (e.g. hard disk drives, flash memory), but some or all of the data may be additionally or alternatively stored in temporary memory (e.g. RAM, processor cache).

As previously discussed, in many cases scans may be required or preferred to evaluate query results. In the case of scanning, it may be important for data access to be quick. Increasing scanning speed may be accomplished by reducing the amount of work required per byte of data and/or by pipelining dataflows.

To increase scanning performance, S122 may include structuring data into large contiguous blocks. The size of these blocks is determined by a threshold cost; that is, blocks are preferably large enough that the processing cost (or time cost, etc.) of scanning a block of data is substantially larger than the cost of moving to the next data block.

Step S122 may include structuring data physically based on data storage system characteristics. For example, contiguous blocks may be broken by RAID stripes, file system blocks, and chucks or blocks of distributed overlay file systems; in these cases, Step S122 preferably includes structuring data physically to avoid undesired block breaks. For example, Step S122 may include reducing block size from a first value to prevent block breaking by RAID stripes.

As another example, Step S122 may include choosing data location (e.g., the location on disk) to avoid or reduce block breaking.

Step S122 may also include adjusting physical data structure parameters (e.g., block size, location, type of storage, etc.) based on empirical parameters. For example, Step S122 may include measuring throughput of a data storage system and adjusting data structure parameters to increase throughput.

Step S122 preferably includes structuring data physically to take advantage of pipelining on disk, but may additionally or alternatively include structuring data physically to take advantage of CPU pipelining. For example, physical data structure parameters may be set based on CPU cache size (as opposed to solely on characteristics of a data storage system).

In addition to setting data block size, Step S122 preferably also includes setting data location. Setting data location may refer to locating data blocks on a particular hard drive, or to locating data shards on particular nodes of a distributed computing system, or to locating data in any other manner.

Step S122 may additionally or alternatively include copying data; for example, if a particular data shard may be duplicated in another location if doing so increases query performance. In general, Step S120 may include structuring data in such a way that may increase data size on disk, but decreases the amount of data scanned (e.g., denormalization and multiple copies). This is often a good tradeoff because raw disk space may be comparatively less expensive than the cost of decreased scanning performance.

Step S120 may additionally include structuring data physically (S122) according to a particular logical data structure (S121) or vice versa. For example, block size may be set (in Step S122) based on a particular data structure set in Step S121. As another example, shard size (Step S121) may be set based on a particular chosen block size (Step S122). Step S120 preferably includes structuring data logically and physically such that physical and logical data structures cooperatively increase scanning and/or query performance.

Step S120 may additionally include structuring anomalous data in a different manner than non-anomalous data; for instance, anomalous data may be sharded (by Step S121) or physically structured (by Step S122) in a different manner than non-anomalous data. Note that here the term "sharded" (or "sharding") refers to the process of organizing data in data shards, typically by ordering and/or grouping data by a "shard key" and then partitioning data into different database shards (or "data shards") by the shard key.

Step S130 includes compressing data. Step S130 functions to reduce the amount of memory occupied by a set of data; by compressing data, Step S130 may enable both more efficient use of memory and speed increases (e.g., if a system can process data at some particular bit rate, increasing the information density per unit bit may result in a net speed increase).

One of the techniques often used to increase data processing speed involves storing data in volatile memory (e.g. RAM, cache) as opposed to on disk. For big data (where it may be prohibitively expensive to store all data in volatile memory), compression increases the amount of data that can be fit into volatile memory, in turn increasing speed. Compression may also translate to performance increases for on-disk reads; increasing the amount of information contained within a set data size (e.g., 1 MB) increases efficiency (assuming that decompression is less costly than the advantage gained from reading information more quickly).

Compression performed by Step S130 is preferably lossless compression; that is, compression does not result in the loss of data. Additionally or alternatively, Step S130 may include performing lossy compression.

Step S130 preferably includes performing columnar compression S131. Step S131 functions to compress information stored in columnar databases (or other databases) by column in such a way that decompressing said information is computationally inexpensive; this may allow for increasing speed both in-memory and on-disk as previously discussed. Further, the nature of many types of columnar compression allow for streaming decompression (i.e., columns can be decoded in a stream rather than in large blocks), allowing for increased compatibility with pipelining (as discussed in Step S120).

Some examples of columnar compression performed by Step S131 may include run-length encoding and delta encoding.

Run-length encoding takes advantage of repeated values; run-length encoding compresses a list of values into a list of tuples with a value and the number of times the value occurs. An example of run-length encoding is as shown in FIG. 3. Run-length encoding is particularly advantageous in sparse columns with long sequences of nulls or in columns where data has been cleverly sorted. For example, if a column includes a sequence of records related to a particular user, attributes of that user may require only a single run-length encoded entry. Run-length encoding may pair well with denormalization.

Delta encoding takes advantage of values who differ from entry to entry with a value substantially less than the values themselves (i.e., $|v\_1-v\_2|<<|v\_1|$ or $|v\_2|$). With delta encoding, each value is stored as a difference from a previous value (rather than as an absolute value). An example of delta encoding is as shown in FIG. 4. Delta encoding is particular advantageous with measurements taken over time; for example, temperature data from sensors.

Performing columnar compression S131 may additionally or alternatively include performing any other suitable type of columnar compression; for example, dictionary encoding, trim encoding, null encoding, and UTF8 encoding. For example, Step S131 may include performing both run-length encoding and delta encoding.

Step S130 may additionally or alternatively include performing dictionary encoding S132. Dictionary encoding functions to convert strings to integers (which may require less computational resources to use); the integers can then be converted back to strings using a string dictionary. In many cases, this translation is not even necessary—the values of two strings may not be important (e.g., it is important only whether the strings match or not).

Step S132 preferably includes performing dictionary encoding using a string dictionary. String dictionaries function to store information linking strings to integers that uniquely identify the strings. The mapping of strings to identifiers in the string dictionary is preferably stored in a manner that enables prefix matching (e.g. by use of a trie data structure), but may additionally or alternatively stored in any suitable manner. String dictionaries are preferably distributed across computers in a distributed computing system. String dictionaries may be partitioned into data shards; data shards of the string dictionary preferably correspond to data shards of event data, but the string dictionary may additionally or alternatively be partitioned independent of other data.

Dictionary encoding S132 may be performed per column (in other words, Step S132 is part of performing columnar compression S131), but may additionally or alternatively be performed across multiple columns of a dataset. Each field of data to be compressed preferably corresponds to independent string lookup data shards of the string dictionary. This enables the same integer identifiers to be used for different strings in different fields. The relationship between string lookup shards and dataset fields is preferably one-to-one, but alternatively may be any suitable relationship; for example, if two fields contain similar string data, (e.g. middle name and first name), they may share a string lookup shard.

Step S132 preferably includes translating strings in received event data to string identifiers before event data is written to a dataset, but may additionally or alternatively include translating the strings to string identifiers at any suitable time. String identifiers are preferably identifiers linked to the specific string, but the corresponding identifier may additionally or alternatively be linked to other data. For example, an identifier might only correspond to a string if the string has a particular value and the string is part of a particular field or type of event data. This enables identifiers to be reused for different data types; for example, the integer identifier "42" might correspond to the string "Canada" for data in a "Country" field and might correspond to the string "January" for data in a "Month" field.

If a string to be compressed by Step S132 already has a corresponding identifier in the string dictionary, the string is translated into that identifier. If the string does not have a corresponding identifier, a corresponding identifier is preferably created for the string. The corresponding identifier is preferably the next available identifier in the string dictionary; but may alternatively be chosen according to the string value. For example, all string values beginning with the letters a, b, or c may have an integer identifier starting with a "1". If identifiers are chosen according to string value, identifier lookup data is preferably stored in a format that enables prefix matching.

Step S130 may additionally or alternatively include performing any other type of compression; e.g., Lempel-Ziv-Welch (LZW) encoding, Huffman coding, and Fibonacci encoding.

Step S130 may additionally include compressing anomalous data in a different manner than non-anomalous data; for instance, anomalous data may use a separate string dictionary (e.g., in Step S132) than non-anomalous data.

Step S140 includes storing data. Step S140 preferably includes storing data according to data structuring (determined in Step S120), but may additionally or alternatively include storing data preliminarily (e.g, before structuring) or storing data at any time for any purpose. Data is preferably stored in a columnar database on disk or in volatile memory, but may additionally or alternatively may be stored in any suitable database in any suitable physical location. Data stored by Step S140 is preferably event data, but may additionally or alternatively be any suitable data. Step S140 may include storing data in any manner described in the sections on Step S120.

If Step S140 includes preliminarily storing data, Step S140 preferably preliminarily stores data in order of timestamp. Storing the data in order of timestamp preferably allows for large amounts of real-time data to be stored without spending expensive processing time to organize and/or rewrite the data.

Step S150 includes receiving a query. Step S150 initializes a query evaluation process; once a query is received, it can be interpreted (Step S160), executed (Step S170), and query results can be returned (Step S180).

Figure 5:
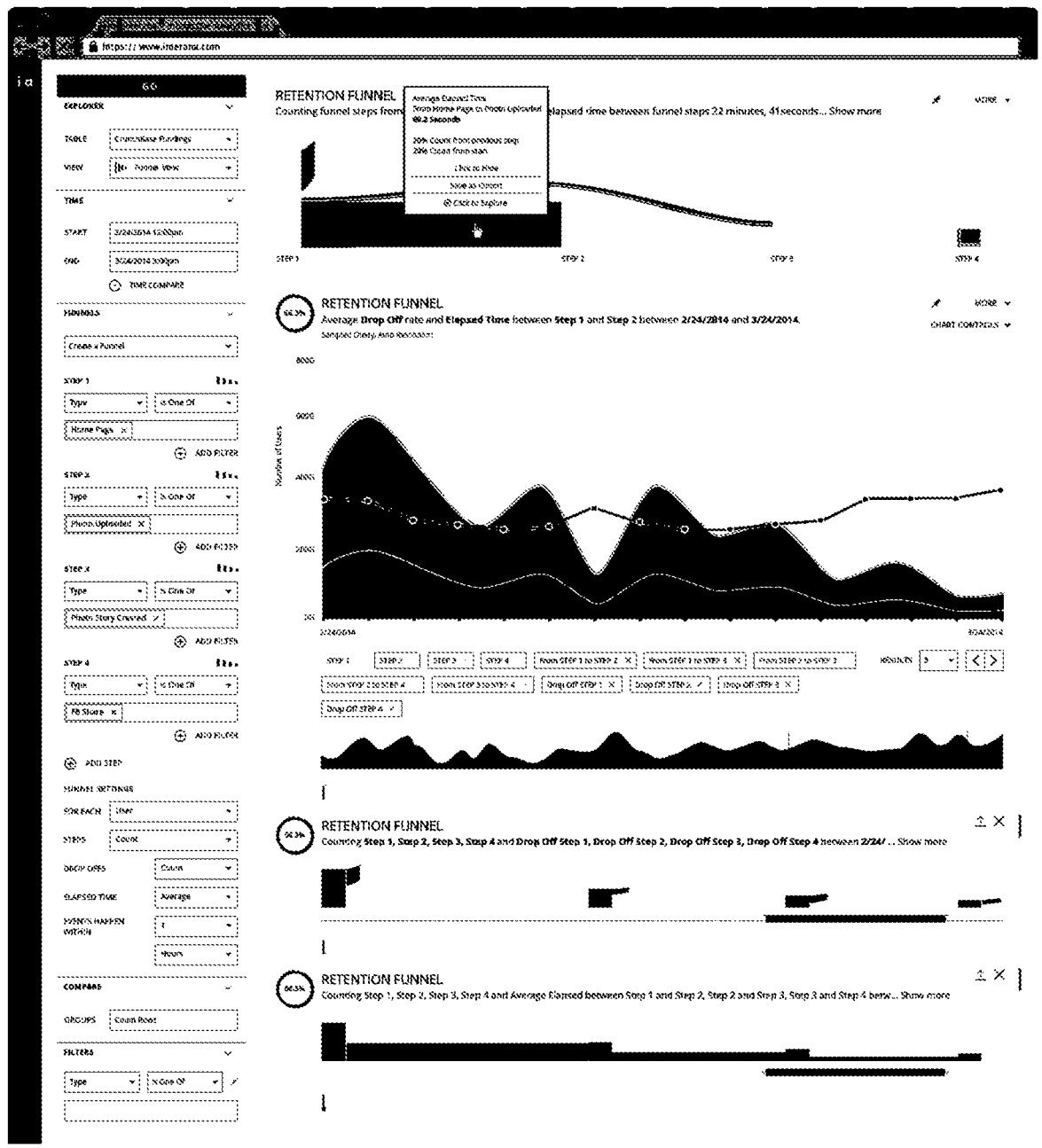
FIG. 5 is an example view of automatic query generation.

Step S150 preferably includes receiving a query from a user through an API, but may additionally or alternatively include receiving a query from any suitable source (e.g., automated queries from a computer, user queries generated by a graphical data analysis platform). Queries may be generated either manually or automatically by data analysis platforms; for example, queries may be generated as shown in FIG. 5.

Queries may include event data sources, time ranges, filters, partition functions, and metric functions. Event data sources are preferably references to event data fields in an event database; for example, "e.sweater_id" might refer to an event data field corresponding to a type of sweater sold. Time ranges are ranges of time over which a query should be searched; queries preferably ignore event data for which the "e.time" value is outside the specified time ranges. Filters preferably allow data to be included or excluded from a query based on a filtering condition; filters are preferably applied to any event data that satisfies the time ranges, but may additionally or alternatively be applied to any other event data. Any event data that does not satisfy the filters is preferably excluded from query results. In this way, the time range is preferably similar to other filters, except in that the time range preferably has higher priority than other filters. For example, if a set of filters includes a filter that states "e.sweater_id>10", "Filter(e)" would return "False" for any events "e" with "e.sweater_id≤10". Partition functions are preferably evaluated for any event data that satisfies both time ranges and filters, but may additionally or alternatively be applied to any other event data. Partition functions preferably group events together by satisfaction of one or more relations. The partition function preferably returns all events that satisfy the partition function; for example, "partition(e.sweater_id,23)" would return all events containing that satisfy "e.sweater_id=23". Metric functions preferably produce statistical data from partition functions. Metric functions preferably include functions that produce a sum, percentile, proportion and/or percentage of event data that satisfies a given condition. If the results of a partition function are interpreted as a representative sample from a broader population, metrics may be considered as sample-based estimates of the corresponding broader population metrics. In these cases, query results (S180) preferably provide confidence bands for the estimates, equivalent to such as may be obtained by statistical bootstrapping.

Queries may additionally or alternatively include ordering and/or grouping functions. Ordering functions preferably allow for ordering of query results. Ordering functions are preferably applied to final results, but may additionally or alternatively be applied to intermediate results (for example, if ordered results are necessary for a calculation in a query step). Grouping functions preferably allow for grouping of query results. Similar to ordering functions, grouping functions are preferably applied to final results, but may additionally or alternatively be applied to intermediate results. Grouping functions may additionally include cohort functions. Cohort functions are a specific case of grouping functions that divide a population of objects into a set of cohorts, with each object appearing in exactly one cohort.

In a variation of a preferred embodiment, Step S150 includes receiving custom query code. Custom query code refers to query instructions not present or defined in code; for example, a user may want a query to utilize a business metric not defined in the native query code. This code may be foreign code (e.g., non-native query language like SQL) or native query code. Custom query code is preferably compiled when the custom query code is used during query execution (i.e., just-in-time compilation), but may additionally or alternatively be compiled at any suitable time.

Step S160 includes interpreting the query. Step S160 functions to convert a query into a set of actions that can then be executed (Step S170) to return a set of query results (Step S180).

Step S160 preferably includes parsing queries, including translating strings in the query to integers if the dataset is dictionary-encoded. Step S160 may additionally or alternatively include any other type of interpretation or pre-processing; e.g., performing user authentication, user-friendly string resolution (e.g. resolving "now" into a current timestamp), and parsing SQL-like query strings into a query tree.

Step S160 preferably also includes resolving where data relevant to the query resides (either via calculation or a lookup to a configuration database), performing error handling, scaling, table joins, and/or any math necessary to evaluate the query.

If a query includes custom query code, Step S160 preferably includes pre-processing the custom query code. This may include converting code from a foreign language (e.g., any language other than a native query language) to the native query language or performing any additional pre-processing steps mentioned above.

In a variation of a preferred embodiment, Step S160 may include interpreting natural language queries (or graphical queries). For example, Step S160 might include converting a query like "What users were active on March 21st in Thailand?" into an actionable query. Natural language queries are preferably interpreted based on lexical analysis, but may additionally or alternatively be interpreted in any suitable manner.

Step S170 includes executing the query. Step S170 functions to perform any operations necessary to return query results and then to return said query results.

Step S170 preferably includes executing the query using a multiple pass sampling method. On the first pass, small samples from a large number of data shards in a dataset may be scanned simultaneously. Step S170 preferably includes performing intermediate calculations on the samples to identify or refine potential query results. This set of potential query results is then used as input for a next pass. The next pass may be another identification/refining pass (similar to the first pass, but with a different input), or the next pass may be a final pass. The final pass preferably includes full scans of data shards containing suspected relevant information to the query, but may additionally or alternatively include only partial scans of data shards. Query results are preferably calculated from the results of the final pass.

For example, a query seeks to identify the top 100 most active users over the past month for a particular website. In the first pass, data shards of an event dataset (containing user id and activity data, and distributed across many nodes of a distributed computing system) are queried; on each node, query execution attempts to identify the top users from small samples of the data. The results of the first pass are then compared, and a list of the top 10,000 users is generated from data sample estimations. A full scan of all data shards containing data on those 10,000 users is then executed, and from this list the top 100 users are determined.

The number of passes is preferably assigned manually and defaults to two passes, but may additionally or alternatively be set automatically. The sampling method (including how much data is sampled in each pass and how samples are chosen in each pass) is preferably determined automatically according to a desired confidence interval and level. For example, the samples chosen for a population estimate desired to be within a particular confidence interval at a particular confidence level would preferably be chosen randomly; the number of samples corresponding to the minimum number required for such a confidence interval and level. The sampling method may additionally or alternatively include sampling other than random sampling for data known to not be normally distributed and/or not comprised of independent and random variables. For example, if a set of data is generally known to follow a particular distribution (either from past queries or other data sources), the set of data may be sampled according to that particular distribution.

In one variation of a preferred embodiment, Step S170 may include executing queries based on a speed/accuracy variable (which may be part of a query or may be a general setting applied to queries). This speed/accuracy variable would preferably adjust the number of passes and/or number of samples taken to produce a result. For example, a query with the speed/accuracy variable set close to the "maximum speed" value might take a very small number of samples, but might also potentially return inaccurate answers. As the speed/accuracy variable is adjusted toward the "maximum accuracy" side, the query takes more time and/or processing power, but returns more accurate results. Step S170 may additionally include estimating query times based on this speed/accuracy variable; e.g., generating an estimate of how long the query will take and how accurate the results of the query will be. Query estimations could be used by users (or automatically as part of Step S170) to adjust sampling variables.

After some threshold has been reached, (e.g., a certain number of passes, an elapsed time threshold, or a confidence value threshold), Step S170 includes returning query results. Step S170 preferably includes returning raw data (e.g., event data) and/or metric data, but may additionally or alternatively include returning a confidence interval, confidence level, or other estimation of the accuracy of query results.

In addition to returning events and metrics, Step S170 may additionally or alternatively include returning objects and/or groups of objects (called cohorts). For example, a query may request the set of "terminal_id" values for events that satisfy the partition function "partition(e.sweater_id,23)". Cohorts may include behavioral cohorts; e.g., a group of users satisfying a particular sequence of events. For example, the group of users that were active on a particular website for more than ten hours over a one-week timespan.

If a query includes custom query code, Step S170 preferably includes compiling and executing the custom query code. Custom query code is preferably compiled when the custom query code is used during Step S170 (i.e., just-in-time compilation), but may additionally or alternatively be compiled at the beginning of Step S170 or at any other suitable time.

Example Use Cases

The method 100 may find use in the identification and handling of anomalous data. Identifying and handling anomalous data may be particularly important when a sampling-type query is used to perform data analysis; if a data anomaly is not evenly distributed across a data sample used for a query, the result of the query may be severely distorted. Identifying and handling anomalous data may also be particularly important in a sharded environment; if a data anomaly affects how data is sharded, this may result in inefficiencies in data analysis. In a sharded environment having a sampling-type query system, both of these effects may be in play.

For example, a sharded database may be sharded by user ID (UID). A common issue in such databases is that in rare cases a UID (henceforth referred to as an anomalous UID) may be shared by many users (e.g., if UID is determined by IP address, and a large number of users sit behind a single public IP address, or because a single UID is assigned to all unknown users). Given the size of the data associated with anomalous UID (compared to other UIDs) and/or the difference in behavior between anomalous UIDs and other UIDs, a data sample including data associated with an anomalous UID may be drastically different from a truly representative sample. Resultantly, it may be desired to modify query sampling to ignore or otherwise account for the non-representative nature of anomalous data. This could be done, for instance, during a query, or pre-query by flagging anomalous data (e.g., using metadata tags).

Further, given the distinct characteristics of anomalous data, the same storage and/or sorting (e.g., structuring) used for other data may be not be ideal or desired for the anomalous data. Resultantly, it may be desired to modify query sampling to ignore or otherwise account for the non-representative nature of anomalous data (e.g., via weighting).

Figure 6:
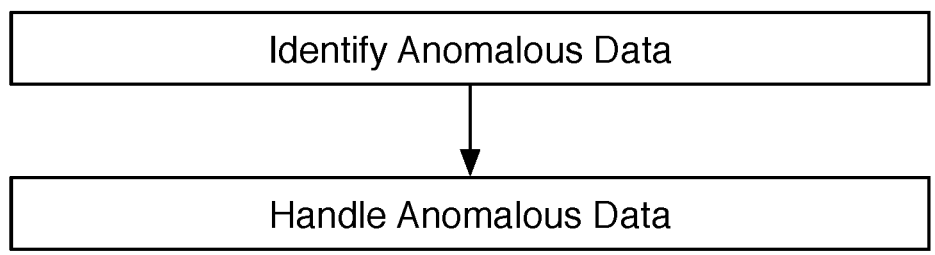
FIG. 6 is a chart view of an example use case of a method of a preferred embodiment.

Accordingly, in such a use case, it may be desired to use the method 100 to identify anomalous data and handle the anomalous data after identification, as shown in FIG. 6. The example use cases following will demonstrate several uses of the method 100 for both identification and handling of anomalous data.

In a first example embodiment, anomalous data may be identified by taking advantage of the principles of data sharding. This embodiment may be useful when data anomalies occur in a field on which the shard key (i.e., the field used to shard the data) is based. Note that the shard key may be based on such a field in any manner; for example, a shard key may be an existing data field (e.g., UID of existing data), a transformed data field (e.g., a hash of UID), and/or a composite of multiple existing and/or transformed data fields (e.g., a hash of UID appended with an index generated from IP address).

Figure 7:
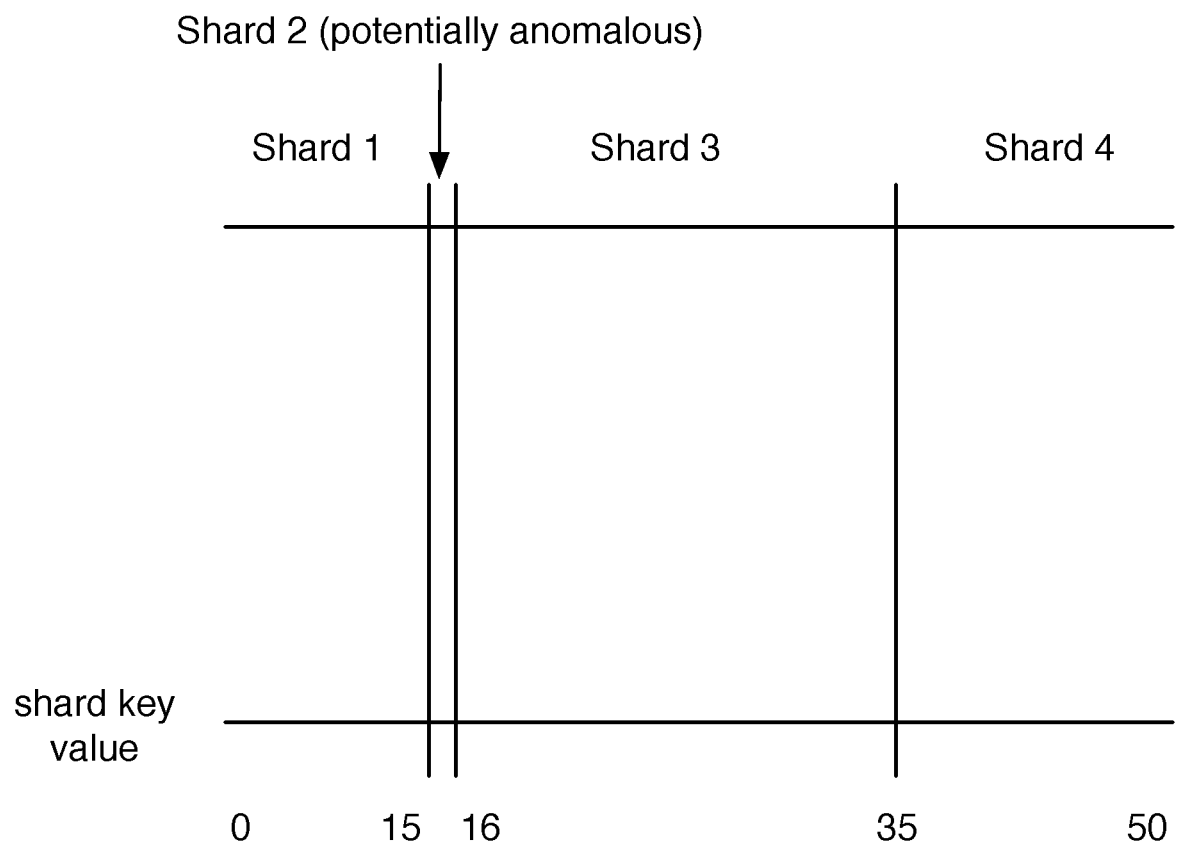
FIG. 7 is a diagram view of shard distribution across shard key space.

In the first example embodiment, the shards are distributed across shard key space, but this distribution is not necessarily uniform. For example, it may be desirable to have shards have roughly similar sizes (e.g., number of entries). Accordingly, the dataset may be sharded such that density/range of shard key values within a shard is dependent on the size of the data associated with the shard key values. For example, a first shard may contain all of the data associated with shard keys 1, 2, 3, 4, 5, 6, 7, 8, and 9, where each of these shard keys is associated with two entries (for a total of 18 entries), while a second shard may contain only the data associated with shard keys 10 and 11, where these shard keys are associated with 7 and 12 entries respectively (for a total of 19 entries). Thus, the first shard has a higher shard key density (number of shard keys per shard) and range (difference between highest and lowest shard key value) than the second shard, and the second shard contains slightly more data than the first shard. Note that while shards may be desired to be similar sizes, this is not necessary (and shard size and/or distribution of shards across shard key space may be set in any manner). An example of shard distribution across shard key space is as shown in FIG. 7.

Based on the rules of shard partitioning, and the resulting sharded structure of a dataset, the method 100 may be used to identify anomalous data through examination of the dataset's sharding structure (according to those rules, as well as rules constituting what determines anomalous data). In the case where sharding occurs based on number of entries as described previously, the sharding structure may serve to identify shard keys associated with substantially more entries than other shard keys (as shown in FIG. 7). If the range of shard indices associated with a shard is small (e.g., smaller than an average or expected range by some threshold), that may be an indicator that the shard contains data associated with an anomalous shard key. Alternatively, the method 100 may include identifying that one or more data shards contains anomalous data by using analysis of sharding structure as a potential indicator of such (in any manner). Here "sharding structure" may include any set of characteristics related to how the dataset is organized into shards.

The method 100 may include determining that this range is small in any manner (or may determine or infer any other indicator that a shard key may be associated with a large number of entries compared to other shard keys). For example, if a table is kept corresponding shard indices to shards, that table may be scanned to determine the distribution of shard keys across shards (and thus potentially which ones are outliers). As another example, if data sampling of a shard reveals a large number of identical shard key values, (e.g., the same UID is seen for each entry sampled from a shard), this may be an indicator that the shard contains a large number of entries corresponding to a single shard key. More generally, similar techniques may be used to identify anomalous data if any unexpected repetition of values (of any field, not just the shard key) occurs during a query, sample, or scan.

While examples of value repetition (occurring, for example, during data storage, data analysis, data sampling, or query execution) are used herein, it is understood that any statistical techniques may be used to identify anomalous data. For example, it may be that any UID having a data element count (e.g., number of data entries associated with that UID) more than two standard deviations above the mean data element count is considered a statistical outlier (and thus potentially anomalous).

Once data has been identified as anomalous, it may be handled in a number of ways: by flagging the anomalous data, by restructuring the anomalous data (which may also include restructuring the entire dataset), by aggregating the anomalous data, or by modifying a process that may be dependent on the anomalous data (e.g., a query, if anomalous data is identified during the query) to treat the data differently.

Flagging the anomalous data may occur in any manner, for example, by tagging data with metadata. Such flags may be used at a later time (e.g., to restructure data, or to exclude data from sampling during queries). Data flags preferably indicate that data is anomalous, but may additionally or alternatively include descriptive information (e.g., how the data is anomalous) or handling information (e.g., how a query should treat the anomalous data).

Restructuring the anomalous data (and/or other data in the dataset) may occur in any manner. For example, data may be restructured physically (e.g., anomalous data may be placed on slower disks, or may not be cached) or logically (e.g., anomalous data may be grouped, sorted, sharded, etc. differently). In one example, restructuring the anomalous data may include partitioning it into subsets. This may be particularly useful in cases where a single shard key may be more accurately represented as multiple shard keys; for example, if three users share a UID (due to being behind a router, and the UID being based on IP address), it may be desired to split the UID into three UIDs, one for each user. A partitioning algorithm may be used to partition anomalous data in any way, but preferably partitions anomalous data by examination of one or more data fields of the anomalous data (typically fields other than those in which anomalies are detected). For example, a single UID may be split by analyzing user behavior; for example, if the UID shows data from two different browser user agent IDs (another field of the data) at the same time, this may be an indication that two users share the UID (and that the first user corresponds to one user agent ID, while the second user corresponds to the second user agent ID). Such a partitioning algorithm may be specified manually, determined automatically from patterns in anomalous data, or set in any manner.

Aggregating anomalous data may be useful in cases where independent events (or entries) in anomalous data may not be relevant to a query of the overall data, but an aggregate or other model representation of the anomalous data may be useful. For example, an aggregate or model of anomalous data may be used in a query instead of the raw anomalous data (potentially, the smaller model may be kept in a cache which the raw data is not).

If anomalous data is discovered during execution of some process (e.g., a query), the process may be modified to account for the presence of (or otherwise handle) anomalous data, without explicitly affecting the anomalous data itself. For example, if during a query, it is discovered that data is anomalous (in any manner), the query may choose to ignore the anomalous data, give it less weight than other data, and/or modify data sampling (if the query execution involves data sampling).

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for identifying anomalous data in a computer database comprising:
   receiving a set of data;
   storing the set of data in a first set of database shards of the computer database; wherein the first set of database shards is partitioned, according to a set of shard partitioning rules, by a first field;
   identifying anomalous data from the set of data, wherein the anomalous data is a subset of the set of data, by:
      monitoring shard key density, shard key range, and shard size of the first set of database shards to identify at last one of anomalous shard key density, anomalous shard key range, and anomalous shard size;
      in response to identification of at least one of an anomalous shard key density, an anomalous shard key range, and an anomalous shard size for a first database shard of the first set of database shards, detecting that the first database shard may contain anomalous data; and identifying data of the first database shard as anomalous data; and restructuring the anomalous data in response to identification of the anomalous data.

2. The method of claim 1, wherein the anomalous shard key density is a shard key density that is lower than a threshold value.

3. The method of claim 1, wherein the anomalous shard key range is a shard key range that is lower than a threshold value.

4. The method of claim 1, wherein the anomalous shard size is a shard size that is smaller than a first threshold value or larger than a second threshold value.

5. The method of claim 1, wherein restructuring the anomalous data comprises using a partitioning algorithm to partition the anomalous data into subsets based on values of a second field of the set of data.

6. The method of claim 1, wherein in response to identification of an anomalous shard key density, data of the first database shard is identified as anomalous data, and the anomalous data is restructured in response to the identification of the anomalous data.

7. A method for data analysis, enhanced by identification of anomalous data in a computer database, the method comprising:

receiving a set of data;

storing the set of data as database shards of the computer database; wherein the database shards are partitioned, according to a set of shard partitioning rules, by a first field;

receiving and interpreting a query; wherein interpreting the query comprises identifying a first set of the database shards containing data relevant to the query;

identifying anomalous data from the set of data, wherein the anomalous data is a subset of the set of data, by:

monitoring shard key density, shard key range, and shard size of the first set of database shards to identify at last one of anomalous shard key density, anomalous shard key range, and anomalous shard size;

in response to identification of at least one of an anomalous shard key density, an anomalous shard key range, and an anomalous shard size for a first database shard of the first set of database shards, detecting that the first database shard may contain anomalous data; and identifying data of the first database shard as anomalous data; and collecting a first data sample from the first set of the database shards;

calculating a result to the query based on analysis of the first data sample;

wherein the analysis of the first data sample weights the anomalous data differently than other data of the first data sample.

8. The method of claim 7, wherein the anomalous shard key density is a shard key density that is lower than a threshold value.

9. The method of claim 7, wherein the anomalous shard key range is a shard key range that is lower than a threshold value.

10. The method of claim 7, wherein the anomalous shard size is a shard size that is smaller than a first threshold value or larger than a second threshold value.

11. The method of claim 7, further comprising flagging the anomalous data using metadata.

12. The method of claim 7, further comprising restructuring the anomalous data in response to identification of the anomalous data.

13. The method of claim 12, wherein restructuring the anomalous data comprises using a partitioning algorithm to partition the anomalous data into subsets based on values of a second field of the set of data.

14. The method of claim 7, wherein calculating a result to the query based on analysis of the first data sample comprises:

performing intermediate calculations on the first data sample to identify intermediate query results, wherein the first data sample includes at least a portion of the anomalous data, and wherein performing intermediate calculations comprises weighting the anomalous data differently than other data of the first data sample; and performing a full scan of all shards of the first set that contain data related to the intermediary results to calculate the result to the query.

15. The method of claim 7, wherein collecting the first data sample comprises performing data sampling to ignore the identified anomalous data.

* * * * *